United States Patent
Donegan et al.

(10) Patent No.: US 9,380,765 B2
(45) Date of Patent: *Jul. 5, 2016

(54) BIRD FEEDER WITH ROTATING PERCH

(71) Applicant: Classic Brands, LLC, Denver, CO (US)

(72) Inventors: Robert Donegan, Denver, CO (US); Bryan Krueger, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/486,904

(22) Filed: Sep. 15, 2014

(65) Prior Publication Data

US 2015/0000604 A1    Jan. 1, 2015

Related U.S. Application Data

(63) Continuation of application No. 13/855,523, filed on Apr. 2, 2013, now Pat. No. 8,833,301.

(60) Provisional application No. 61/619,414, filed on Apr. 2, 2012.

(51) Int. Cl.
*A01K 31/12*  (2006.01)
*A01K 39/01*  (2006.01)
*A01K 39/012* (2006.01)

(52) U.S. Cl.
CPC .............. *A01K 39/01* (2013.01); *A01K 39/012* (2013.01)

(58) Field of Classification Search
CPC ................................. A01K 31/12; A01K 39/01
USPC ......... 119/57.8, 52.3, 57.9, 51.01, 52.2, 52.4, 119/59, 63
See application file for complete search history.

(56) References Cited

U.S. PATENT DOCUMENTS

| | | | | |
|---|---|---|---|---|
| 4,188,913 A * | 2/1980 | Earl et al. | | 119/57.9 |
| 4,223,637 A * | 9/1980 | Keefe | | 119/52.2 |
| 5,105,765 A * | 4/1992 | Loken | | 119/57.9 |
| 5,947,054 A * | 9/1999 | Liethen | | 119/57.9 |
| 6,119,627 A * | 9/2000 | Banyas et al. | | 119/57.9 |
| 6,415,737 B2 * | 7/2002 | Banyas et al. | | 119/57.9 |
| 6,622,654 B2 * | 9/2003 | Fasino | | 119/57.9 |
| 7,021,241 B2 * | 4/2006 | Nock | | 119/57.8 |
| 7,448,346 B1 * | 11/2008 | Stone et al. | | 119/52.3 |
| 7,549,394 B2 * | 6/2009 | Nock | | 119/57.8 |
| 7,739,982 B2 * | 6/2010 | Cote | | 119/57.9 |
| 2003/0136347 A1 * | 7/2003 | Fasino | | 119/57.9 |
| 2004/0231606 A1 * | 11/2004 | Nock | | 119/57.8 |
| 2005/0263085 A1 * | 12/2005 | Rich | | 119/57.8 |
| 2006/0225658 A1 * | 10/2006 | Baynard | | 119/57.8 |
| 2007/0034160 A1 * | 2/2007 | Nock | | 119/57.8 |
| 2007/0163506 A1 * | 7/2007 | Bloedorn | | 119/52.2 |
| 2007/0227454 A1 * | 10/2007 | Fahey | | 119/57.8 |
| 2009/0223456 A1 * | 9/2009 | Hunter et al. | | 119/53 |
| 2010/0089330 A1 * | 4/2010 | McMullen | | 119/52.3 |
| 2012/0234249 A1 * | 9/2012 | Gaze | | 119/57.8 |

* cited by examiner

*Primary Examiner* — Trinh Nguyen
(74) *Attorney, Agent, or Firm* — Polsinelli PC (57) ABSTRACT

Implementations described and claimed herein provide apparatuses and methods for providing different perch positions for feeding birds. In one implementation, a bird feeder having a perch mounted on a wall of a reservoir having an interior configured to hold bird food is provided. The reservoir has a wall opening to provide access to the interior. The perch is rotated to one of a plurality of positions about an axis line extending through a center of the wall opening.

20 Claims, 13 Drawing Sheets

BIRD FEEDER WITH ROTATING PERCH

CROSS-REFERENCE TO RELATED APPLICATIONS

The present application is a continuation of U.S. patent application Ser. No. 13/855,523 entitled "Bird Feeder with a Rotating Perch" and filed on Apr. 2, 2013, which claims priority under 35 U.S.C. §119(e) to U.S. Provisional Patent Application No. 61/619,414, entitled "Goldfinch Feeder" and filed on Apr. 2, 2012. Each of these applications is specifically incorporated by reference herein in its entirety.

BACKGROUND

Many bird feeders offer a number of fixed perches with corresponding feeding openings positioned relative to each of the perches. However, such bird feeders fail to consider that birds, particularly different species of birds, feed in a variety of positions. For example, the goldfinch often feeds upside down, while the house finch is unable to feed upside down. Accordingly, if an owner desires to attract goldfinches and exclude house finches and other birds, the owner generally must purchase a bird feeder having feeding openings positioned below each perch. However, if the owner changes his mind and wishes to attract house finches and other birds in addition to goldfinches, the owner must generally purchase another bird feeder entirely with feeding openings placed above each perch. Accordingly, many bird feeders fail to take into consideration the variety of positions in which different birds, particularly the goldfinch and house finch, feed.

It is with these observations in mind, among others, that various aspects of the present disclosure were conceived and developed.

BRIEF SUMMARY

Implementations described and claimed herein address the foregoing problems by providing apparatuses and methods for providing different perch positions for feeding birds. In one implementation, a bird feeder having a perch mounted on a wall of a reservoir having an interior configured to hold bird food is provided. The reservoir has a wall opening to provide access to the interior. The perch is rotated to one of a plurality of positions about an axis line extending through a center of the wall opening.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve apparatuses and methods for providing different perch positions for feeding birds. In one particular aspect, a bird feeder with a rotating perch is provided. The bird feeder includes a reservoir configured to hold bird food. The reservoir has a wall and at least one opening in the wall providing access to the bird food. A feeding station is configured to be mounted on the wall relative to the opening. The feeding station includes a port through which a bird may access the bird food in the reservoir and a perch from which the bird may access the port. The perch is connected to the port such that the perch may be rotated to a plurality of positions relative to the port. The different positions allow birds that feed from different positions to access the bird food and further allow the owner to choose what birds to attract.

Figure 1:
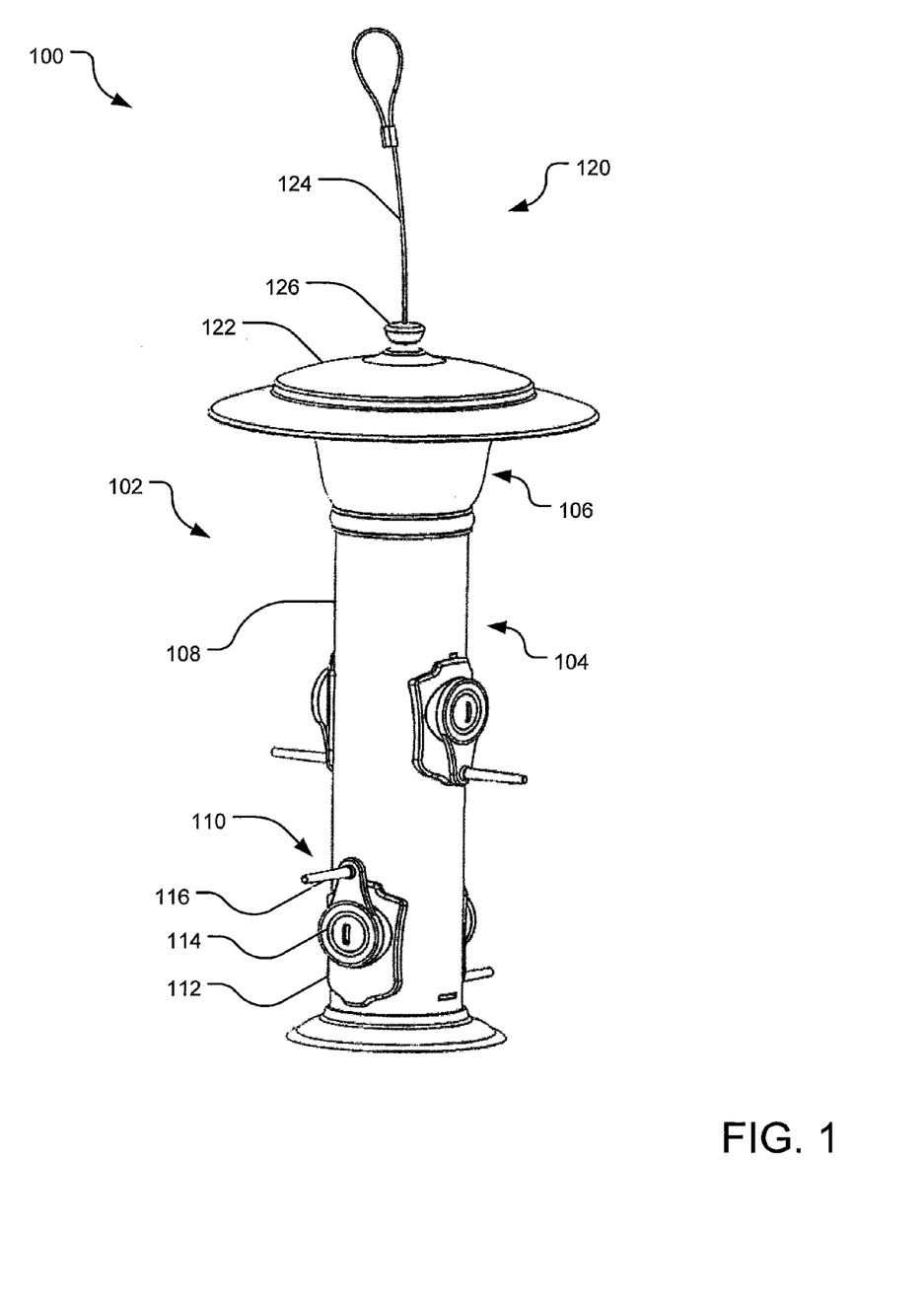
FIG. 1 illustrates a perspective view of an example bird feeder having a rotational perch.

As can be understood from FIG. 1, which shows a perspective view of an example bird feeder 100, a reservoir 102 is configured to hold bird food, which may be a variety of different bird seeds of different sizes. In one implementation, the reservoir 102 includes a tube 104 and a mouth 106. The tube 104 has a generally cylindrical shape and the mouth 106 is tapered to accept bird food with minimal spillage. However, other shapes of the tube 104 and the mouth 106 are contemplated. The tube 104 includes a wall 108 having at least one opening providing access to the bird food. The bird feeder 100 includes a feeding station 110 configured to be mounted on the wall 108 relative to the opening. The feeding station 110 includes a port 112 through which a bird may access the bird food in the reservoir 102 and a perch 116 from which the bird may access the port 112. The perch 116 is connected to the port 112 such that the perch 116 may be rotated to a plurality of positions relative to the port 112. In some implementations, the feeding station 110 further includes a port plug 114. The port 112 is configured to receive the port plug 114 to mount the perch 116 on the bird feeder 100 such that it may be rotated to various positions. The bird feeder may include any number of feeding stations, including the feeding station 110. For example, as shown in FIG. 1, the bird feeder 100 may include four feeding stations to accommodate more birds.

The mouth 106 is configured to receive a lid assembly 120 to close or occlude the reservoir 102. In one implementation, the lid assembly 120 includes a lid 122 which extends past the edge of the mouth 106. The lid 122 is held to the mouth 106 by a cable 124, which attached to the reservoir 102 and passes through the lid 122 at a knob 126 that is located at the substantial center of the lid 122. The cable 124 extends upwardly to attach to an item, including, without limitation, a tree limb or a hook.

Figure 2:
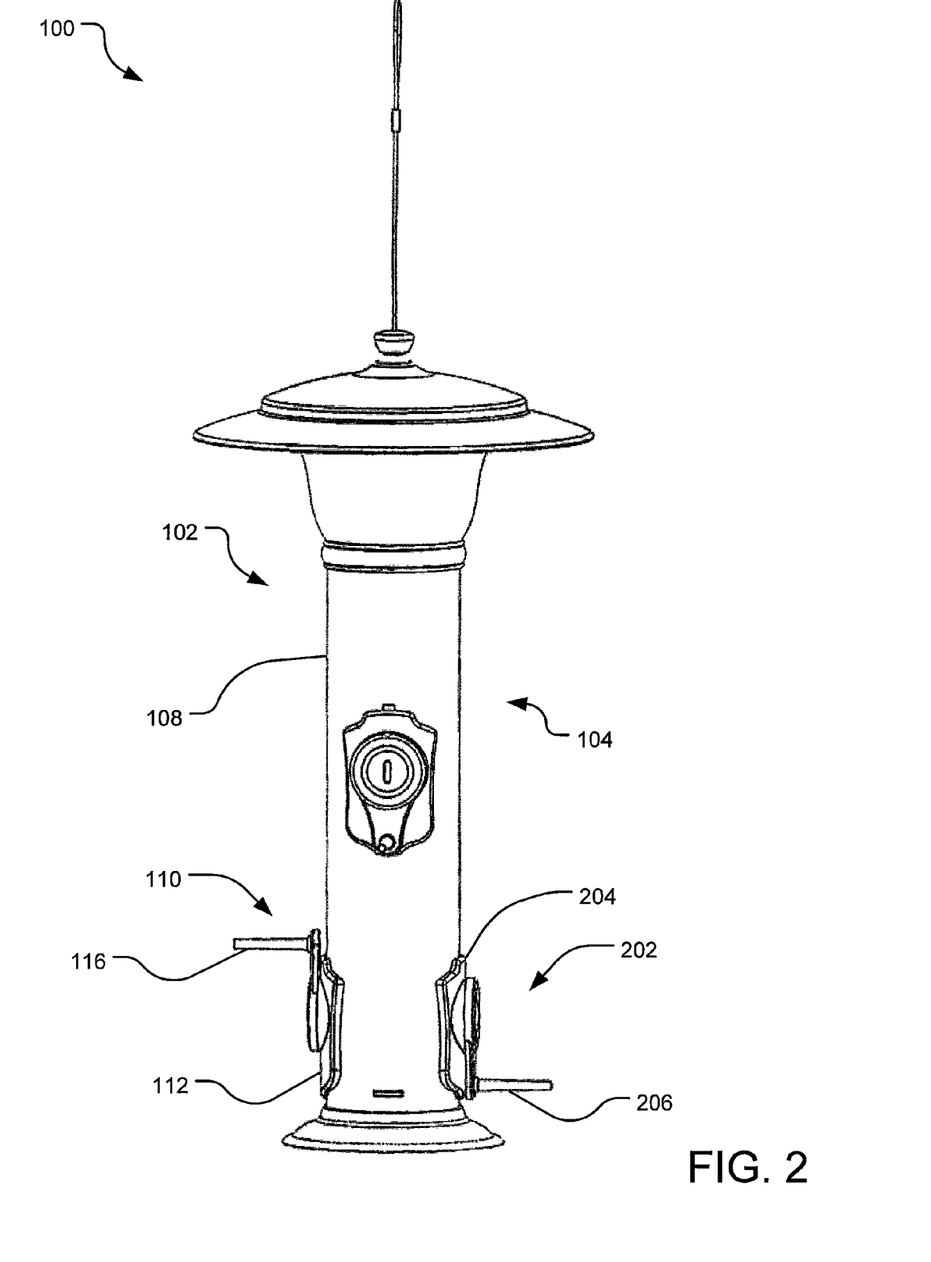
FIG. 2 illustrates, another perspective view of the example bird feeder of FIG. 1.

FIG. 2 illustrates another perspective view of the bird feeder 100, which includes a second feeding station 202 mounted on the wall 108 generally opposite the feeding station 110. The second feeding station 202 includes a port 204 and a perch 206, as described herein. As can be understood from FIG. 2, the perches 116 and 206 may be rotated to a plurality of positions relative to the ports 112 and 204, respectively. For example, the perch 116 is positioned near the top of the port 112, and the perch 206 is positioned near the bottom of the port 204. However, the ports 112 and 204 are stationary, and the position of the ports 112 and 204 does not change as the perches 116 and 206 are rotated.

If an owner desires to attract goldfinches and exclude house finches and other birds, a perch of each feeding station of the bird feeder 100 are rotated to the position of the perch 116, as shown in FIG. 2. Specifically, each of the perches is rotated to a portion near the top of the ports. However, if the owner desires to attract house finches and other birds, the perches may be rotated to the position of the perch 206. The owner may also position the perches such that a first portion of the perches attract goldfinches and exclude other birds, including house finches, and a second portion of the perches attract house finches and other birds in addition to gold finches.

Figure 3:
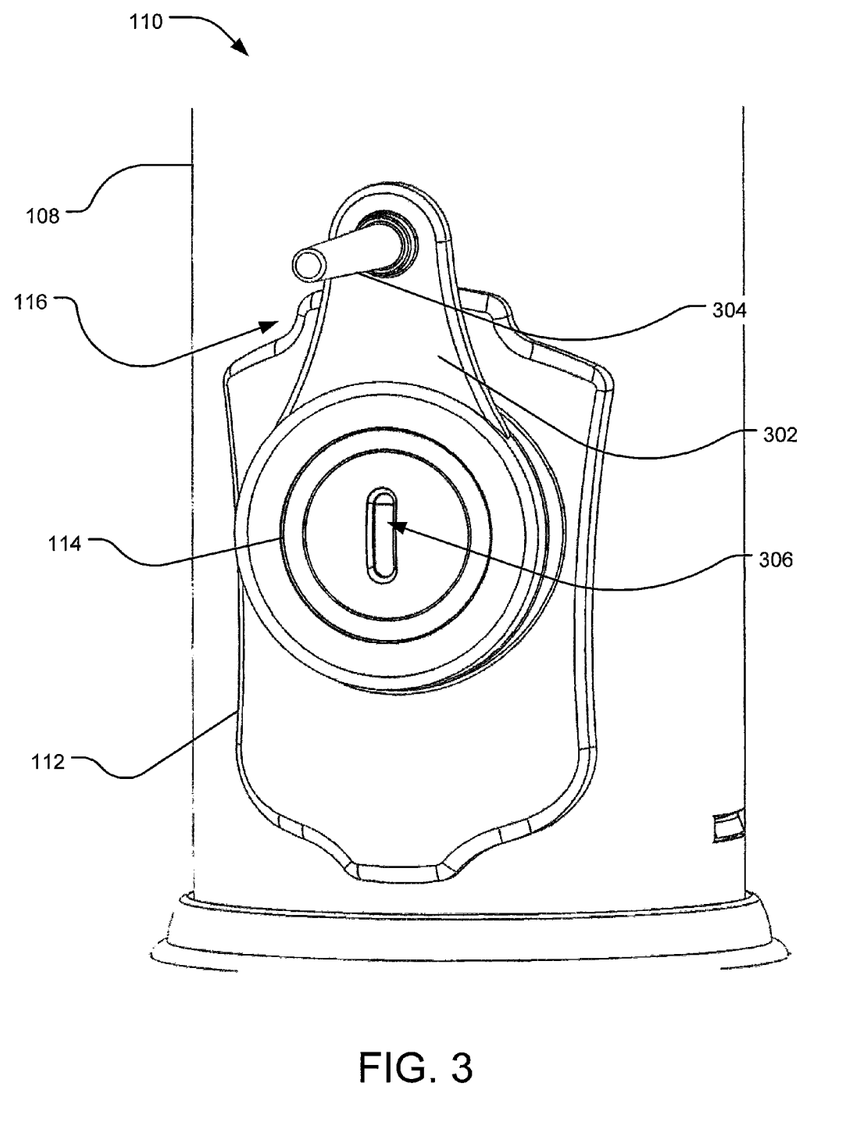
FIG. 3 illustrates an example feeding station having a rotational perch.

As shown in FIG. 3, the feeding station 110 is mounted on the wall 108. In one implementation, the feeding station 110 includes the port 112 and the perch 116, as described herein. In another implementation, the feeding station further includes the port plug 114. The perch 116 includes a surface 302 and a projecting portion 304 that extends from the surface 302. The port 112 is configured to attach the perch 116 to the wall 108 relative to an opening through which bird food may be accessed. In one implementation, the port 112 is configured to receive the port plug 114. As described with respect to FIG. 7, the perch 116 may be disposed between the port 112 and the port plug 114, thereby attaching the perch 116 to the wall 108. Once the perch 116 is attached to the wall 108, the projecting portion 304 extends outwardly from the wall 108.

In one implementation, the port plug 114 includes at least one access opening 306 sized to permit limited access to bird food held in the reservoir 102. For example, the bird food held in the reservoir 102 may be thistle seed, so the access opening 306 may be sized to permit limited access to thistle seed. In one implementation, the access opening 306 is approximately 9.6 mm tall and approximately 2.3 mm wide. However, other dimensions of the access opening 306 are contemplated depending on the size of the bird food held in the reservoir 102. Further, the perch 116 is attached to the port 112, such that as the perch 116 is rotated relative to the port 112. In one implementation, the projecting portion 304 is located at a constant distance relative to the access opening 306. For example, the projecting portion 304 may be consistently located approximately 34 mm away from the access opening 306.

Figure 4:
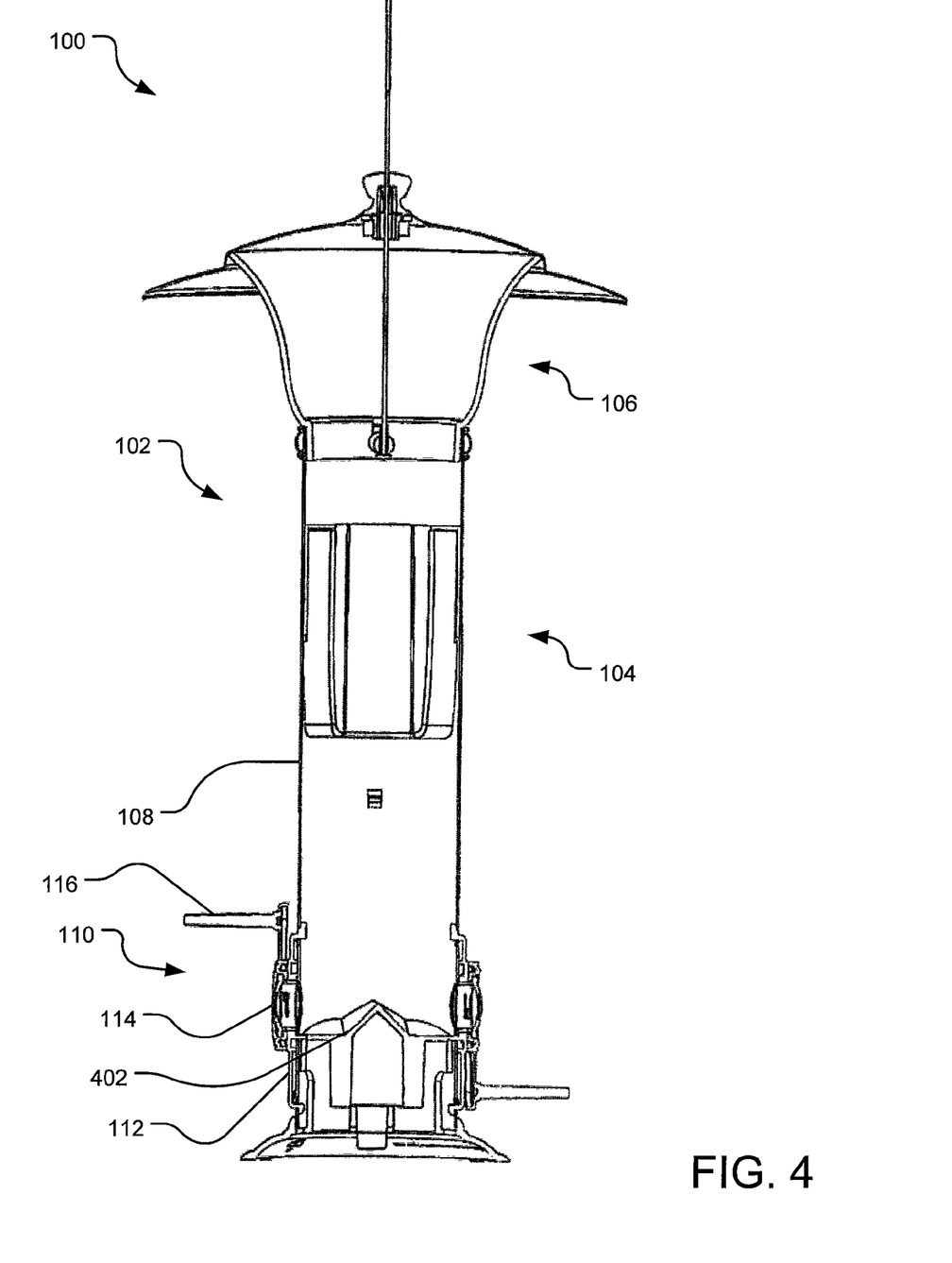
FIG. 4 illustrates a cross sectional view of the example bird feeder shown in FIG. 2.

As can be understood from FIG. 4, which is a cross sectional view of the bird feeder 100, the reservoir 102 may include one or more receiving portions for collecting bird food in the reservoir 102 and allocating the bird food to the one or more feeding stations. For example, a receiving portion 402 includes one or more angled surfaces to direct bird food at the feeding station 110. In some implementations, the receiving portions are configured to allocate bird food deposited in the reservoir 102 evenly to each of the feeding stations included in the bird feeder 100.

Figure 5:
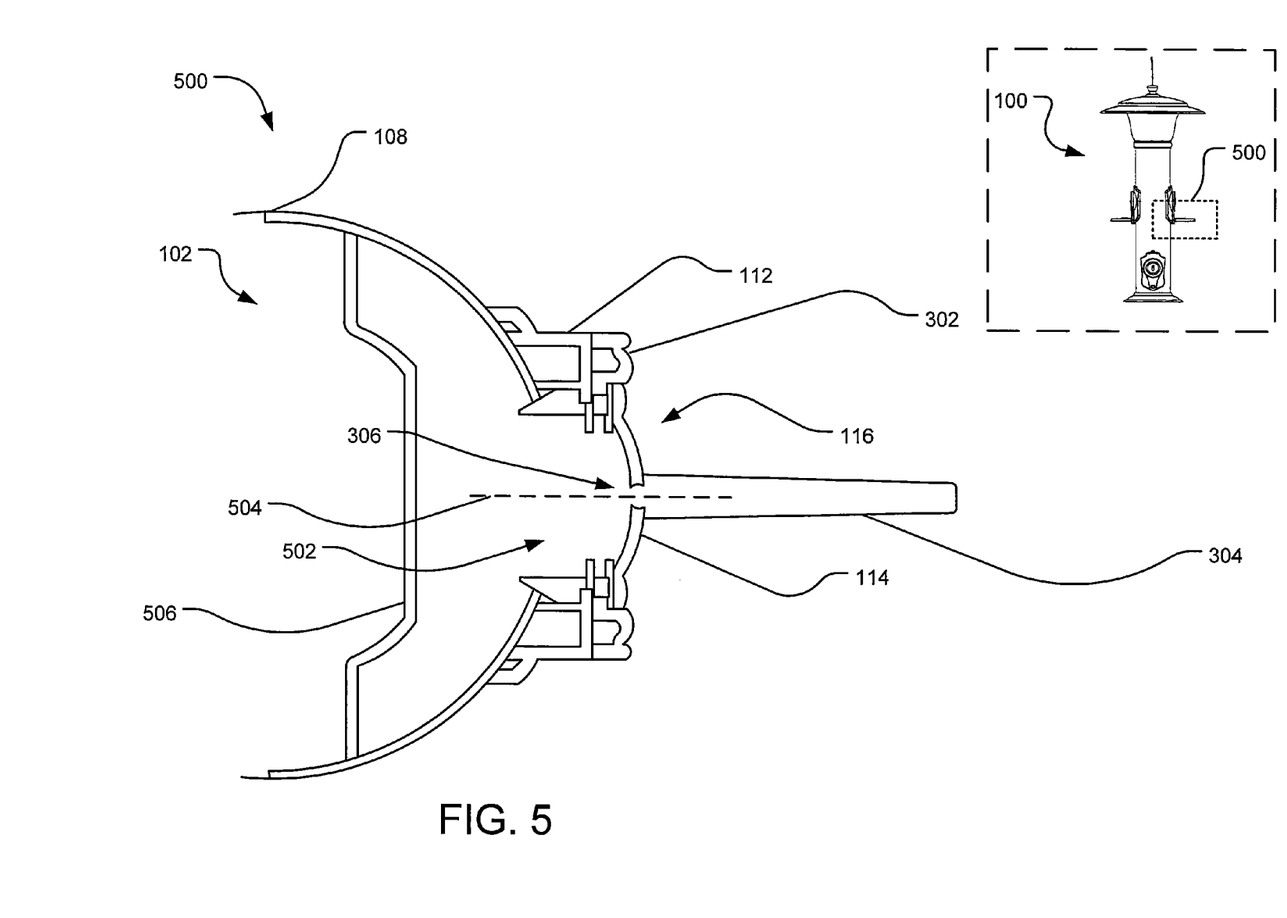
FIG. 5 illustrates a top cross sectional view of an example feeding station having a rotational perch.
Figure 6:
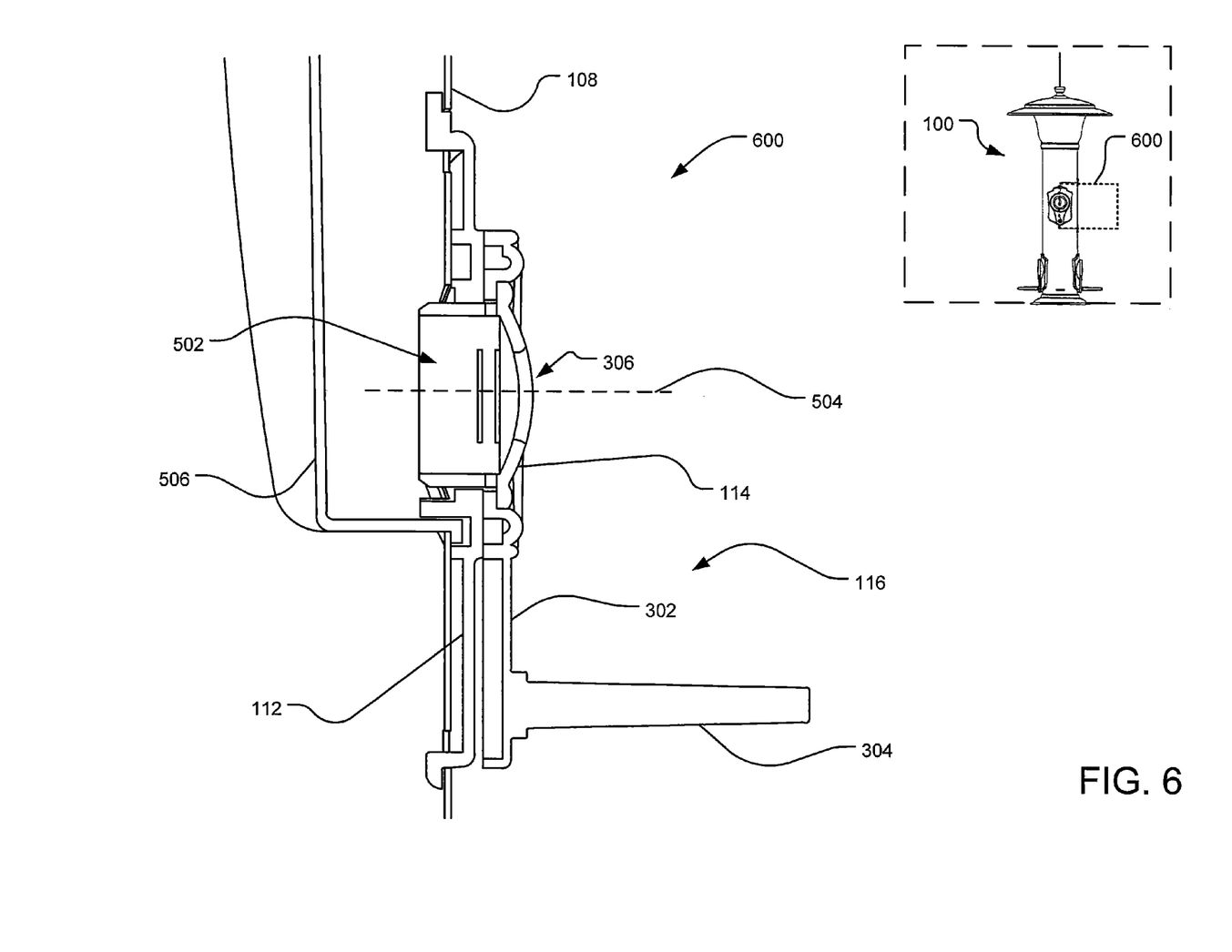
FIG. 6 illustrates a side cross sectional view of an example feeding station having a rotational perch.

FIGS. 5 and 6 show a top cross sectional view 500 and a side cross sectional view 600, respectively, of a feeding station on the bird feeder 100. As described herein, each feeding station is mounted on the wall 108 relative to an opening 502 through which the interior of the reservoir 102 may be accessed. The port 112 is mounted on the wall 108 such that the opening 502 is not obstructed.

In one implementation, the perch 116 is connected to the port 112 using the port plug 114. Specifically, the port plug 114 snaps into the port 112, thereby piercing the wall 108 and retaining the perch 116. The surface 302 and the projecting portion 304 may then be rotated about an axis line 504 which lies at the approximate center of the port plug 114, near the access opening 306. As described with respect to FIGS. 7A-C, in one implementation, the port 112 and the port plug 114 remain stationary as the perch 116 is rotated. Further, as described with respect to FIG. 4, the reservoir 102 may include a receiving portion 506 for collecting and allocating bird food to the access opening 306. As shown in FIGS. 5 and 6, the receiving portion 506 may be a substantially thin wall having one or more surfaces for angling bird food at the access opening 306.

Figure 7A:
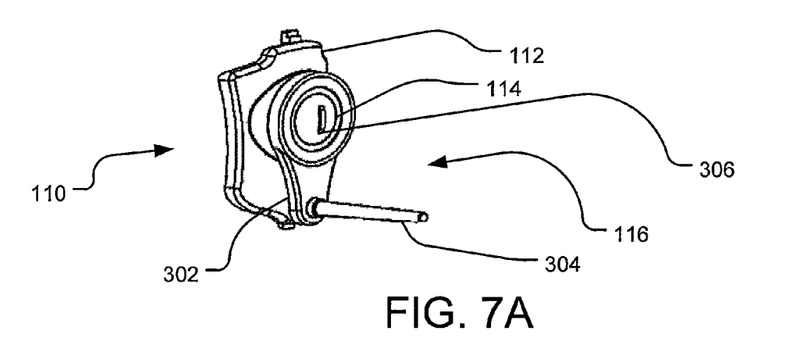
FIGS. 7A-C illustrate three perspective views of an example feeding station showing a perch rotated to various positions.
Figure 7B:
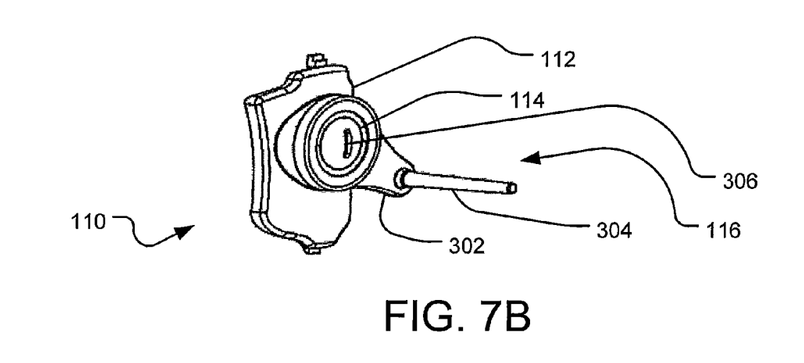
Figure 7C:
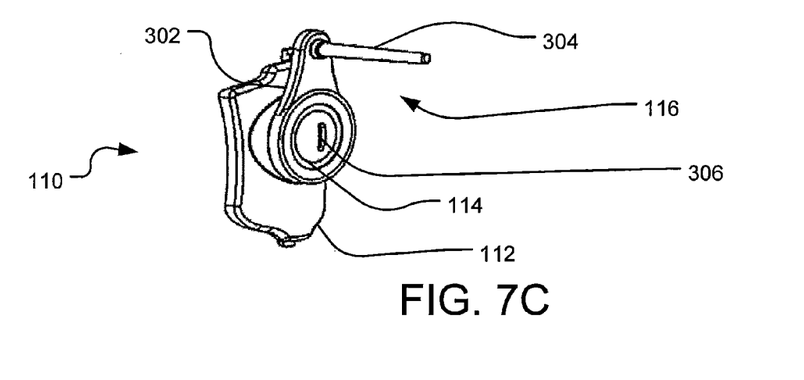
Figure 7D:
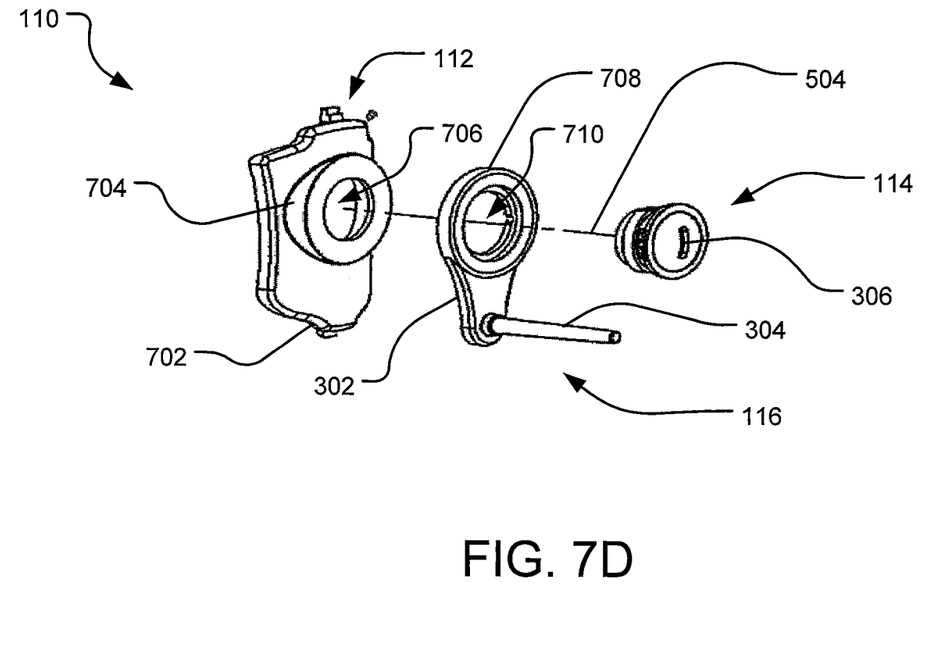
FIG. 7D illustrates an exploded view of the example feeding station.

FIGS. 7A-C illustrate three perspective views of the feeding station 110 showing the perch 116 rotated to various positions. FIG. 7A shows the perch 116 rotated such that the surface 302 and the projecting portion 304 are positioned near the bottom of the port 112 below the access opening 306 on the port plug 114. The position shown in the view 700 may be used to attract house finches, other birds, and the goldfinch. FIG. 7B shows the perch 116 as the perch 116 is rotated counterclockwise towards the top of the port 112. During the rotation, the surface 302 and the projecting portion 304 are positioned at an angle relative to the access opening 306 on the port plug 114. Finally, FIG. 7C shows the perch 116 rotated such that the surface 302 and the projecting portion 304 are positioned near the top of the port 112 above the access opening 306 on the port plug 114. The position shown in the view 704 may be used to attract goldfinches and exclude house finches and other birds. As can be understood from FIGS. 7A-7C, in one implementation, as the perch 116 is rotated, the port 112, the port plug 114, and the access opening 306 remain stationary and are generally not affected by the rotation of the perch 116.

FIG. 7D illustrates an exploded view of the feeding station 110, which includes the port 112, the perch 116, and the port plug 114. In one implementation, the port 112 includes a surface 702 and a protruding portion 704 extending from the surface 702. The protruding portion 704 defines an opening 706. The surface 702 is shaped to mirror the shape of the wall 108 such that the surface 702 fits snugly against the wall 108 once mounted. The protruding portion 704 has a generally circular shape. It will be understood by those of ordinary skill in the art that the protruding portion 704 may have a variety of shapes, including, but not limited to, rectangular, elliptical, triangular, and polygonal, and the surface 702 may have a variety of shapes, including shapes that do not mirror the shape of the wall 108.

In one implementation, the perch 116 includes a ring 708 defining an opening 710. The ring 708 is sized relative to the protruding portion 704. For example, the ring 708 may be the same size as the protruding portion 704 such that when the protruding portion 704 is connected to the ring 708, the openings 706 and 710 create substantially one opening. However, in other implementations, the ring 708 is larger or smaller in size compared to the protruding portion 704. In one implementation, the protruding portion 704 is configured to receive the port plug 114 such that the perch 116 is disposed between the port 112 and the port plug 114. The general center of the openings 706 and 710 is positioned along the axis 504, which corresponds to the access opening 306 on the port plug 114. The access opening 306 provides the bird access to the bird food in the reservoir 102 via the openings 706 and 710.

Figure 8A:
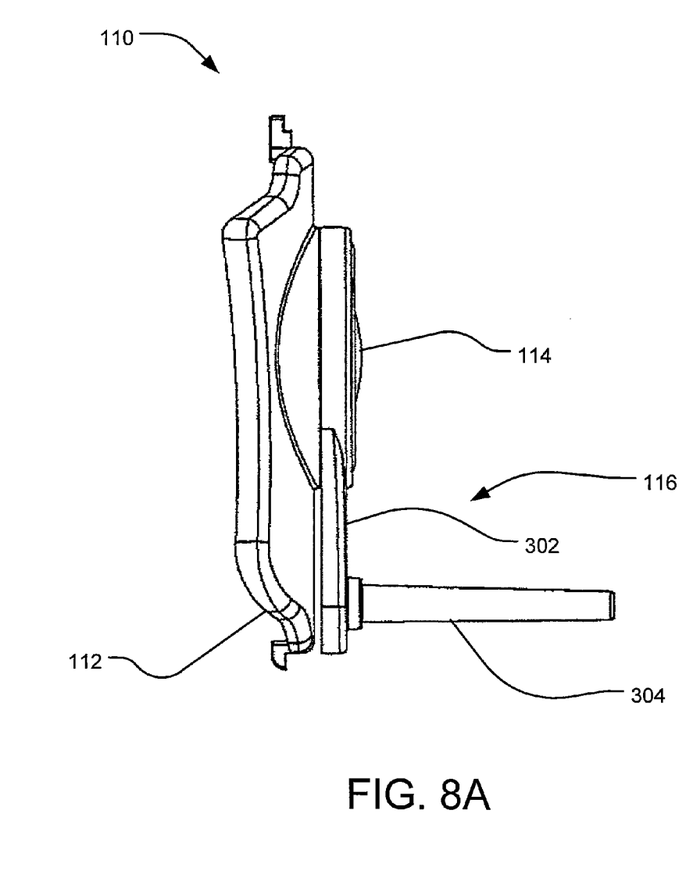
FIG. 8A illustrates a side view of the example feeding station of FIG. 3.
Figure 8B:
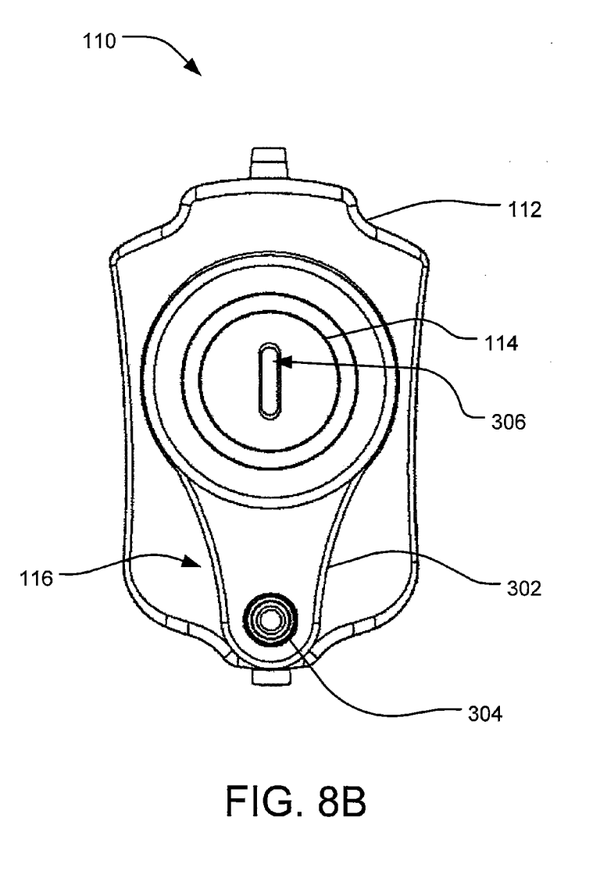
FIG. 8B illustrates a front view of the example feeding station of FIG. 3.

FIGS. 8A and 8B illustrate a side view and a front view, respectively of the feeding station 110. In one implementation, the feeding station 110 includes the port 112 and the perch 116 configured to be mounted on the wall 108 of the reservoir 102 relative to an opening in the wall 108 that permits a bird to access bird food held in the reservoir 102. The perch includes a surface 302 from which a projecting portion 304 extends. The port plug 114 attaches the perch 116 to the port 112 such that the projecting portion 304 may be rotated to various positions relative to the access opening 306, as described herein.

Figure 9:
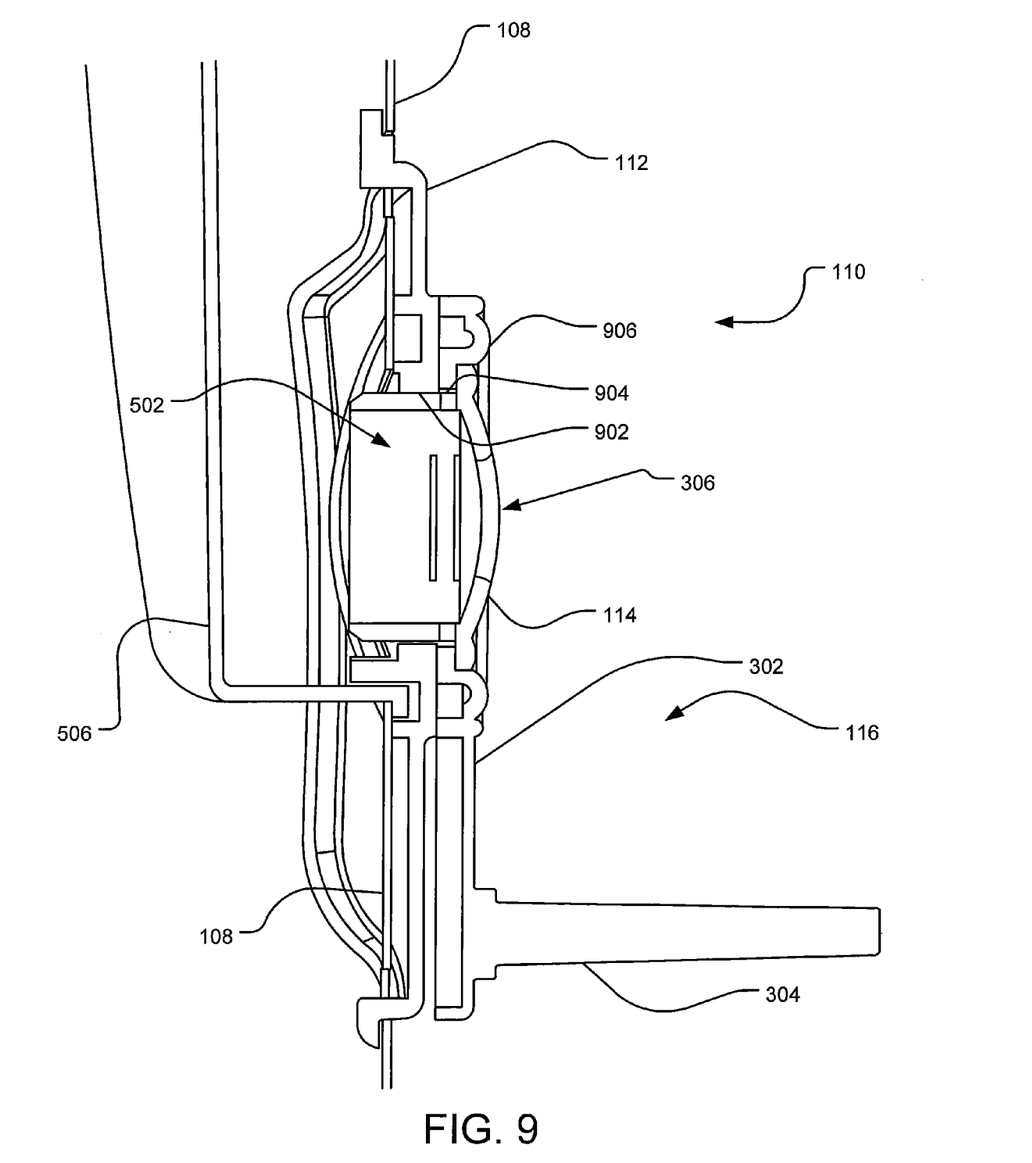
FIG. 9 illustrates another side cross sectional view of an example feeding station having a rotational perch.

As shown in FIG. 9, which is a side cross sectional view, the feeding station 110 is mounted on the wall 108 relative to an opening 502 through which the interior of the reservoir 102 may be accessed. The port 112 is mounted on the wall 108 such that the opening 502 is not obstructed. In one implementation, the perch 116 is connected to the port 112 using the port plug 114. Specifically, the port 112 includes a substantially flat portion 902 configured to engage a channel 904 of the flat portion 902. As described with respect to FIGS. 10-12, a barbed portion 906 is disposed between a portion of the port 112 and a portion of the port plug 114 such that the perch 116 is rotationally mounted to the wall 108. The surface 302 and the projecting portion 304 may then be rotated relative to the access opening 306. As described with respect to FIG. 7, in one implementation, the port 112 and the port plug 114 remain in the same position as the perch 116 is rotated. Further as described with respect to FIGS. 4 and 5, the reservoir 102 may include a receiving portion 506 for collecting and allocating bird food to the access opening 306.

Figure 10:
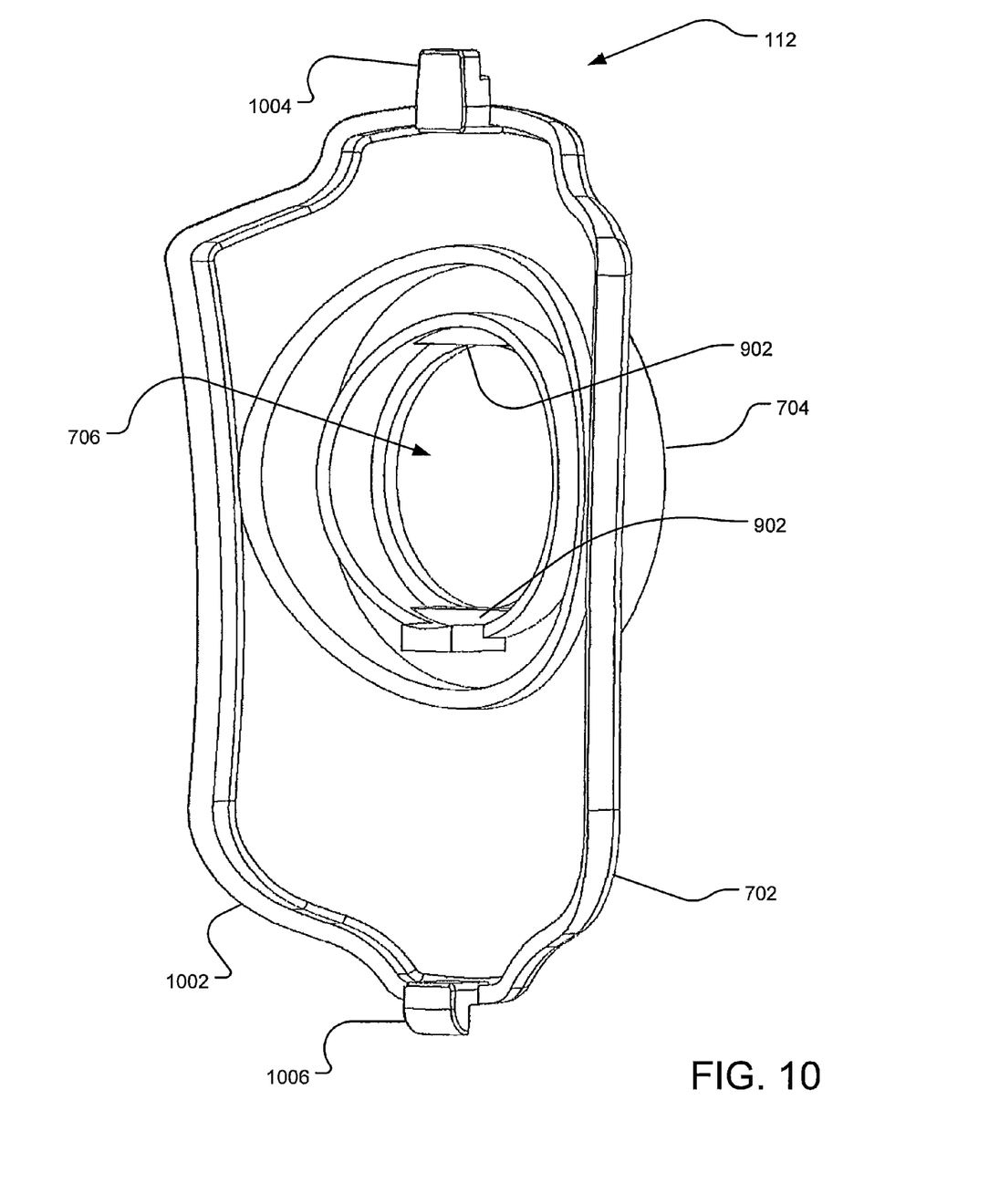
FIG. 10 illustrates a back perspective view of an example port.
Figure 11:
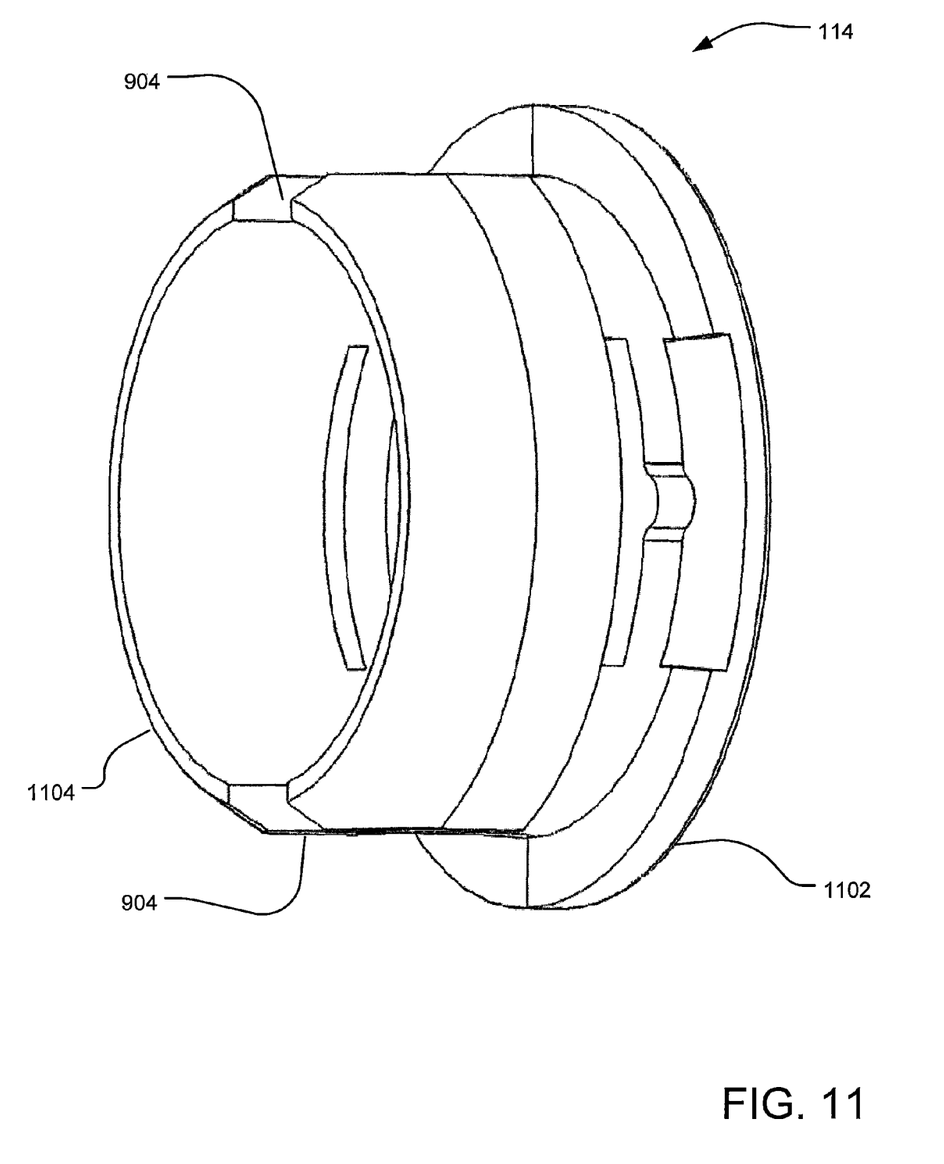
FIG. 11 illustrates a back perspective view of an example port plug.
Figure 12:
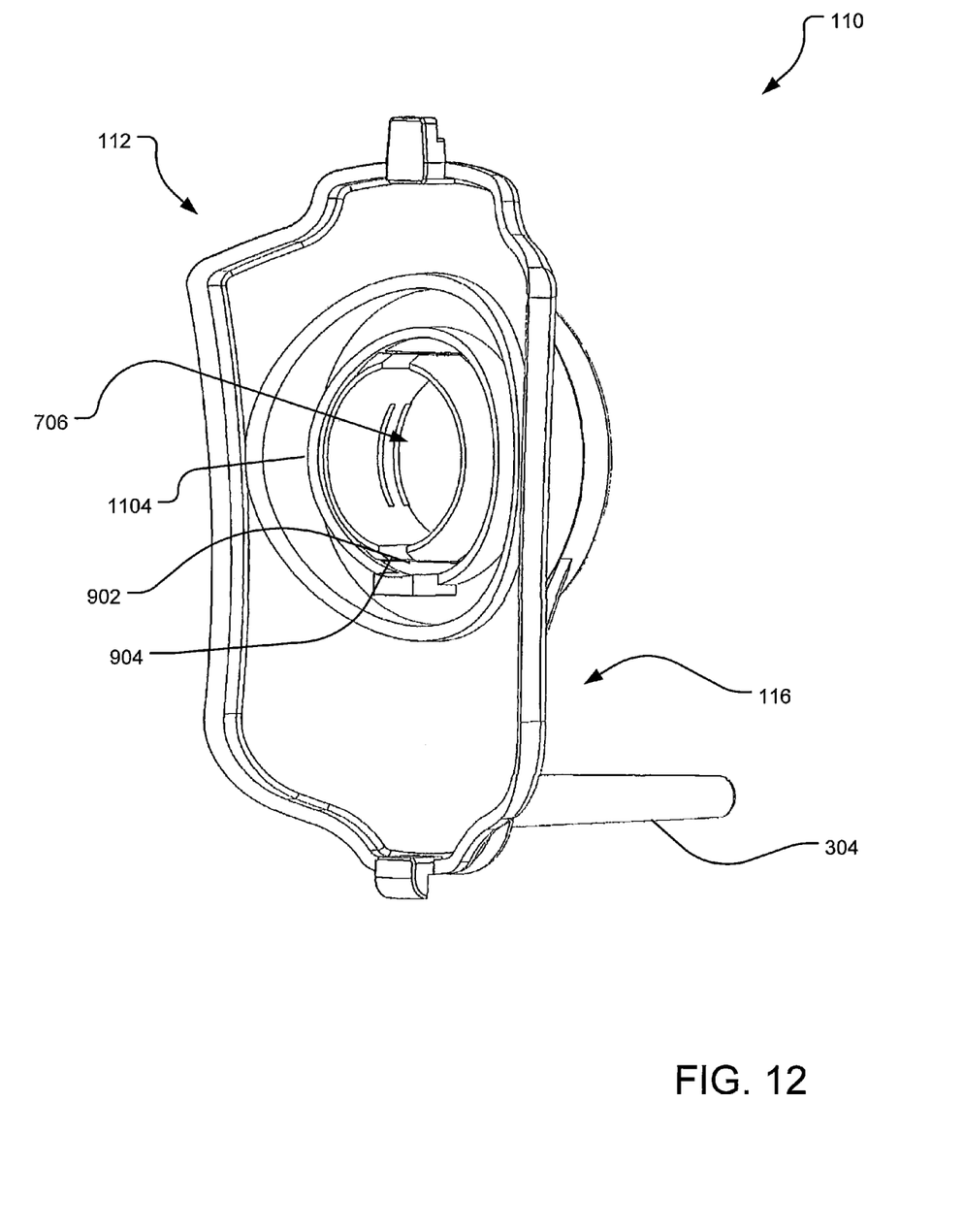
FIG. 12 illustrates a back perspective view of an example feeding station having a rotational perch.

FIGS. 10-12 illustrate back perspective views of various components of the feeder 110. In FIG. 10, the port 112 is shown, which includes the protruding portion 704 extending from the surface 702 to define the opening 706. In one implementation, the protruding portion 704 further includes the substantially flat portions 902 configured to engage the port plug 114. In one implementation, the surface 702 has a lip 1002, a first mounting portion 1004, and a second mounting portion 1106 each configured to engage a portion of the wall 108. For example, the lip 1002 extends from the surface 702 to provide a snug fit against the wall 108 along the length of the lip 1002. Further, the mounting portions 1004 and 1006 are configured to engage the reservoir 102 through an opening in the wall 108.

As can be understood from FIGS. 11 and 12, the port 112 may be configured to engage the port plug 114. In one implementation, the port plug 114 includes a tube 1104 and a lip 1102. The tube 1104 is inserted into the opening 706 such that the channels 904 to engage the flat portions 902 of the port 112. The port plug 114 may be inserted into the opening 706 until the barbed portion 906 of the perch 116 is engaged by both the lip 1104 and the port 112, thereby rotationally attaching the perch 116 to the port 112.

Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various, changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A method for converting a bird feeder for exclusive goldfinch feeding comprising:
   providing a bird feeder having a plurality of feeding stations mounted to a wall of a reservoir, each of the feeding stations including a port and a perch, the port including a protruding portion defining an opening providing access to an interior defined by the wall, the perch having a projecting portion extending from a surface; and
   moving the projecting portion of each of the perches around an axis line extending through a center of the openings defined by the protruding portions from a first position to a second position.

2. The method of claim 1, wherein the projecting portions are moved from the first position to the second position by rotating the projecting portions around the openings defined by the protruding portions.

3. The method of claim 1, wherein the first position is below the openings defined by the protruding portions and the second position is above the openings defined by the protruding portions.

4. The method of claim 1, wherein the projecting portions extend linearly.

5. The method of claim 1, wherein the perches are mounted to the wall using the ports.

6. The method of claim 5, wherein the ports are snapped into the wall and the perches are snapped into the ports.

7. The method of claim 1, wherein the perches each include a ring configured to engage the protruding portion of the port.

8. A method for selecting a desired bird for feeding comprising:
   providing a bird feeder having perch mounted on a wall of a reservoir having an interior configured to hold bird food, the reservoir having a wall opening to provide access to the interior; and
   rotating the perch about an axis line extending through a center of the wall opening to one of a plurality of positions.

9. The method of claim 8, wherein the perch includes a projecting portion extending from a surface.

10. The method of claim 9, wherein the projecting portions extend linearly.

11. The method of claim 8, wherein the perch is mounted on the wall using a port.

12. The method of claim 11, wherein the port includes a protruding portion defining an opening providing access to the wall opening.

13. The method of claim 12, wherein the perch includes a ring configured to engage the protruding portion of the port to mount the perch on the wall.

14. The method of claim 8, wherein the plurality of positions include above the wall opening and below the wall opening.

15. A method for selecting a desired bird for feeding comprising:
mounting a port to a wall of a reservoir, the wall defining an interior and having a wall opening providing access to the interior, the port having a protruding portion defining an opening, the port mounted to the wall such that the opening defined by the protruding portion provides access to the wall opening;
mounting a perch to the port, the perch including a projecting portion extending from a surface; and
moving the projecting portion of the perches around an axis line extending through a center of the opening defined by the protruding portion to one of a plurality of positions.

16. The method of claim 15, wherein the port is mounted to the wall by snapping the port into the wall opening.

17. The method of claim 15, wherein the perch is mounted to the wall by snapping the perch into the opening defined by the protruding portion.

18. The method of claim 15, wherein the perch includes a ring configured to engage the protruding portion of the port to mount the perch to the port.

19. The method of claim 15, wherein the plurality of positions include above the wall opening and below the wall opening.

20. The method of claim 15, wherein the projecting portion extends linearly from the surface.

* * * * *